(12) United States Patent
Zhao

(10) Patent No.: US 8,914,475 B2
(45) Date of Patent: Dec. 16, 2014

(54) METHOD, DEVICE AND TERMINAL FOR EDITING AND PLAYING MUSIC ACCORDING TO DATA DOWNLOAD SPEED

(75) Inventor: Pengxing Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/697,872

(22) PCT Filed: Aug. 23, 2010

(86) PCT No.: PCT/CN2010/076246
§ 371 (c)(1),
(2), (4) Date: Nov. 14, 2012

(87) PCT Pub. No.: WO2011/143858
PCT Pub. Date: Nov. 24, 2011

(65) Prior Publication Data
US 2013/0060917 A1  Mar. 7, 2013

(30) Foreign Application Priority Data
May 20, 2010 (CN) .......................... 2010 1 0178696

(51) Int. Cl.
G06F 15/16 (2006.01)
(52) U.S. Cl.
USPC .......................................... 709/219; 709/232
(58) Field of Classification Search
None
See application file for complete search history.

(56) References Cited

U.S. PATENT DOCUMENTS

| 5,848,239 | A | 12/1998 | Ando | |
|---|---|---|---|---|
| 6,345,039 | B1 * | 2/2002 | Ito | ................................ 370/232 |
| 7,202,407 | B2 * | 4/2007 | Kawashima et al. | ........... 84/609 |
| 2003/0208292 | A1 | 11/2003 | Liu | |
| 2005/0030905 | A1 | 2/2005 | Luo et al. | |
| 2005/0240396 | A1 | 10/2005 | Childs et al. | |
| 2006/0031889 | A1 | 2/2006 | Bennett | |
| 2006/0137515 | A1 * | 6/2006 | Kawamoto et al. | ............. 84/602 |

(Continued)

FOREIGN PATENT DOCUMENTS

| CN | 1181665 A | 5/1998 |
|---|---|---|
| CN | 1949839 A | 4/2007 |

(Continued)

OTHER PUBLICATIONS

International Search Report in international application No. PCT/CN2010/076246, mailed on Feb. 24, 2011.

(Continued)

*Primary Examiner* — John B. Walsh
(74) *Attorney, Agent, or Firm* — Oppedahl Patent Law Firm LLC

(57) ABSTRACT

The disclosure discloses a method, a device and a terminal for editing and playing music according to a data download speed. The method includes: generating, according to a preset number of continuously recorded download speed values, a number of preset speed domains, wherein the number of the preset speed domains is one more than the preset number of the download speed values, and setting one set frequency for each preset speed domain, wherein each set frequency corresponds to one preset musical sound; and playing a preset musical sound corresponding to a set frequency which corresponds to a preset speed domain when an immediate subsequent download speed value is within the preset speed domain. By means of the disclosure, an entertainment effect of "playing music randomly" can be achieved, so that entertainment experience of a user is increased and competitiveness of a product is improved.

13 Claims, 5 Drawing Sheets

(56) References Cited

U.S. PATENT DOCUMENTS

| | | |
|---|---|---|
| 2007/0118043 A1 | 5/2007 | Oliver |
| 2009/0312060 A1 | 12/2009 | Bloebaum et al. |
| 2013/0031216 A1* | 1/2013 | Willis et al. .................. 709/219 |

FOREIGN PATENT DOCUMENTS

| | | | |
|---|---|---|---|
| CN | 101345777 | * | 1/2009 |
| CN | 101345777 A | | 1/2009 |
| CN | 101388233 A | | 3/2009 |
| GB | 2388243 A | | 11/2003 |

OTHER PUBLICATIONS

English Translation of the Written Opinion of the International Search Authority in international application No. PCT/CN2010/076246, mailed on Feb. 24, 2011.

Levels of Temporal Resolution in Sonification of Network Performance Aug. 1, 2001.

Supplementary European Search Report in European application No.: 10851616.2, mailed on Apr. 29, 2013.

* cited by examiner

METHOD, DEVICE AND TERMINAL FOR EDITING AND PLAYING MUSIC ACCORDING TO DATA DOWNLOAD SPEED

TECHNICAL FIELD

The disclosure relates to a data communication technology, and in particular to a method, a device and a terminal for editing and playing music according to a data download speed.

BACKGROUND

At present, a terminal, such as a data card or the like is widely applied to the field of a mobile communication technology. With the continuous development of the mobile communication technology, functions of various terminals, such as the data card and the like are becoming more mature and perfect with a lack of difference between each other, such that how to improve an added value of product to enhance a user's awareness is a problem currently concerned by all manufacturers.

In the related art, there is a method and a device for enhancing aesthetic perception in use of the terminal, such as the data card or the like through enabling a user to intuitively understand a current data transmission speed of a terminal, such as the data card or the like. For example, the Chinese patent CN101345777 discloses a method, a device and a terminal for displaying a running status, wherein the method for displaying the running status includes: acquiring a current data transmission speed of a data service; calculating a ratio of the current data transmission speed to a preset data transmission speed; and selecting music corresponding to the ratio, and displaying the current data transmission speed of the data service according to the music. An embodiment of the disclosure enables a user to intuitively understand a current data transmission speed of a data card, thereby enhancing aesthetic perception in use of the data card. However, although the technology in the above patent can display the transmission speed of the data service to enhance the use aesthetic perception in use of the data card, an added value of a product is not highly elevated, and entertainment effect of the user can not be increased, so that entertainment experience of the user is not high.

SUMMARY

The main purpose of the disclosure is to provide a method, a device and a terminal for editing and playing music according to a data download speed, capable of realizing a music playing function by using a playing unit, thereby increasing entertainment experience of a user and improving competitiveness of a product.

The disclosure provides a method for editing and playing music according to a data download speed, which includes:

generating, according to a preset number of continuously recorded download speed values, a number of preset speed domains, wherein the number of the preset speed domains is one more than the preset number of the download speed values, and setting one set frequency for each preset speed domain, wherein each set frequency corresponds to one preset musical sound; and playing a preset musical sound corresponding to a set frequency which corresponds to a preset speed domain when an immediate subsequent download speed value is within the preset speed domain.

Preferably, the step of generating, according to a preset number of continuously recorded download speed values, a number of preset speed domains, wherein the number of the preset speed domains is one more than the preset number of the download speed values, and setting one set frequency for each preset speed domain, wherein each set frequency corresponds to one preset musical sound may specifically include:

recording a download speed value at a preset time interval after data download is started;

sorting the preset number of the continuously recorded download speed values in ascending order to generate the preset speed domains, wherein the number of the preset speed domains is one more than the preset number of the download speed values; and setting one set frequency for each preset speed domain, wherein each set frequency corresponds to one preset musical sound.

Preferably, the number of the preset speed domains may be seven, and the preset number of the download speed values may be six.

Preferably, the step of playing the preset musical sound corresponding to the set frequency which corresponds to the preset speed domain when the immediate subsequent download speed value is within the preset speed domain may specifically include:

determining which preset speed domain the immediate subsequent download speed value belongs to, and transmitting the set frequency corresponding to the preset speed domain to which the immediate subsequent download speed value belongs to a playing unit; and playing the preset musical sound corresponding to the set frequency by the playing unit.

Preferably, the preset musical sound may be preset music or buzzing sound, wherein the buzzing sound may include seven buzzing sounds whose frequencies are respectively the same as frequencies of seven tones in sequence.

Preferably, the method may further include: after playing the preset musical sound corresponding to the set frequency which corresponds to the preset speed domain when the immediate subsequent download speed value is within the preset speed domain, updating the preset number of the download speed values, and prompting a user whether to turn off an audio function;

if the use selects not to turn off the audio function, sorting the preset number of the continuously recorded download speed values in ascending order to generate the preset speed domains, wherein the number of the preset speed domains is one more than the preset number of download speed values; and if the use selects to turn off the audio function, exiting the application program.

The disclosure provides a device for editing and playing music according to a data download speed, which includes an audio control module and a playing unit, wherein the audio control module is configured to generate, according to a preset number of continuously recorded download speed values, a number of preset speed domains, wherein the number of the preset speed domains is one more than the preset number of the download speed values, and set one set frequency for each preset speed domain, wherein each set frequency corresponds to one preset musical sound; and the playing unit is connected with the audio control module and is configured to play a preset musical sound corresponding to a set frequency which corresponds to a preset speed domain when an immediate subsequent download speed value is within the preset speed domain.

Preferably, the audio control module may include:

a speed recorder, configured to record a download speed value at a preset time interval after the device starts to download data; sort the preset number of the continuously recorded download speed values in ascending order to generate the preset speed domains, wherein the number of the preset speed domains is one more than the preset number of the download speed values; set one set frequency for each preset speed domain, wherein each set frequency corresponds to one preset musical sound.

Preferably, the number of the preset speed domains may be seven, and the preset number of the download speed values may be six.

Preferably, the audio control module may further include an audio master control unit;

the speed recorder is further configured to determine which preset speed domain the immediate subsequent download speed value belongs to, and transmit the set frequency corresponding to the preset speed domain to which the immediate subsequent download speed value belongs to the audio master control unit; and the audio master control unit is connected with the speed recorder and the playing unit, and is configured to transmit the set frequency corresponding to the preset speed domain to which the immediate subsequent download speed value belongs to the playing unit for playing the preset musical sound corresponding to the set frequency.

Preferably, the speed recorder may be further configured to update the preset number of the download speed values, and output prompt information of whether to turn off an audio function.

Preferably, the playing unit may be an audio player.

Preferably, the playing unit may include a buzzer.

The disclosure provides a terminal for editing and playing music according to a data download speed, which includes a device for editing and playing the music according to the data download speed.

In the disclosure, through combining a terminal, such as a data card or the like with a buzzer of a computer or an audio player, a buzzing sound or a preset musical sound with a corresponding frequency is continuously selected according to a download speed and then is played via the buzzer of a mainboard of the computer or the audio player when the terminal, such as the data card or the like downloads data, so that an entertainment effect of "playing music randomly" can be achieved, thereby increasing entertainment experience of a user and improving competitiveness of a product.

DETAILED DESCRIPTION

To make the technical solution of the disclosure more clear and understood, the disclosure will be described in detail with reference to the drawings hereinafter.

The main technical solution adopted by the disclosure includes that: after a data card is connected to a network, a data download speed value (D) is recorded at a preset time interval (the preset time interval can be one second, or two or more seconds), the last six (take six as an example) continuous download speed values (D0-D5) (the number of the continuous download speed values can be preset) is stored only, and the six download speed values are sorted in ascending order to generate seven preset speed domains (C0-C6), wherein the seven preset speed domains correspond to seven preset musical sounds (the preset musical sound can be preset music or buzzing sound) with seven different frequencies; the preset musical sound corresponding to the set frequency which corresponds to the preset speed domain (Cn) is played when the immediate subsequent download speed value (Dn), that is, the subsequent download speed value (Dn) followed by the previous six download speed values is within which preset speed domain (Cn), and then the last six download speed values (D0-D5) are updated to generate seven new preset speed domains (C0-C6); and a function of playing music according to a change of a download speed can be realized by repeating the above processing.

A data card is taken as the example in the following specific embodiments, however, the solution is not limited to the data card and can also be applied to other terminals, wherein the solution is the same, and so further description is not needed.

Embodiment 1

Figure 1:
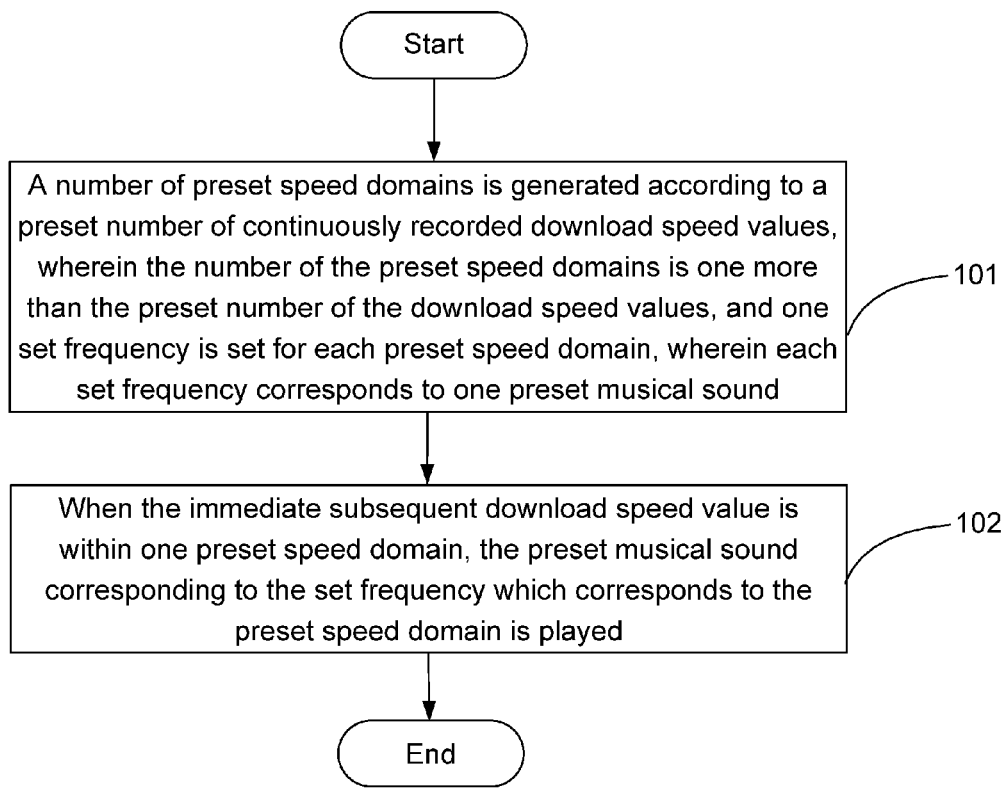
FIG. 1 shows a schematic flowchart of a method for editing and playing music according to a data download speed in Embodiment 1 of the disclosure.

FIG. 1 shows a schematic flowchart of a method for editing and playing music according to a data download speed in Embodiment 1 of the disclosure.

As shown in FIG. 1, the disclosure provides the method for editing and playing music according to a data download speed, which includes the following steps:

Step 101, a number of preset speed domains is generated according to a preset number of continuously recorded download speed values, wherein the number of the preset speed domains is one more than the preset number of the download speed values, and one set frequency is set for each preset speed domain, wherein each set frequency corresponds to one preset musical sound;

in the step, the number of the preset musical sounds is the same as that of the preset speed domains, wherein in the embodiment, the number of the preset musical sounds is seven. Taking downloading data by the data card as an example, in order to achieve the purpose of playing the preset musical sound while downloading the data by the data card, when the data card starts to download the data, a download speed value is recorded at a preset time interval (which can be one second) to acquire six continuous download speed values; then the six download speed values are sorted in ascending order to generate seven preset speed domains; and then one set frequency is set for each preset speed domain, wherein each set frequency corresponds to one preset musical sound;

the preset time interval can be one second, or two or more seconds, and the preset musical sound can be either a preset music composed of some simple single syllables or multi-syllables, or a buzzing sound; and seven buzzing sounds can be seven basic tones 1do, 2re, 3mi, 4fa, 5sol, 6la, and 7si, that is, the frequencies of the seven buzzing sounds can be respectively the same as that of the seven basic tones 1do, 2re, 3mi, 4fa, 5sol, 6la, and 7si in sequence.

In another embodiment, the number of the continuously recorded download speed values can be preset as 4, 5 or other values; correspondingly, the number of preset speed domains generated according to the continuously recorded download speed values is one more than the number of the download speed values; furthermore, the purpose of playing music according to the download speed values can be achieved through presetting a number of the preset musical sounds, wherein the number of the preset musical sounds is the same as the number of the preset speed domains.

Step 102, when the immediate subsequent download speed value is within one preset speed domain, the preset musical sound corresponding to the set frequency which corresponds to the preset speed domain is played.

The step specifically includes: determining the preset speed domain to which the immediate subsequent download speed value belongs, i.e., determining which preset speed domain the immediate subsequent download speed value is within, and transmitting the set frequency corresponding to the preset speed domain to a playing unit. In the embodiment, the playing unit is an audio player or a buzzer configured on a mainboard of a computer; and the buzzer or audio player receives the frequency corresponding to the preset speed domain, and plays the preset musical sound corresponding to the set frequency which corresponds to the preset speed domain, wherein the preset musical sound is a preset music or a buzzing sound.

In the embodiment, through the combination of the data card with the playing unit (buzzer of a computer or audio player), when the data card downloads data, a preset musical sound with a corresponding frequency is continuously selected according to a download speed and then is played by the playing unit (buzzer or audio player), so that an entertainment effect of "playing music randomly" is achieved, thereby increasing entertainment experience of a user and improving competitiveness of a product.

Embodiment 2

Figure 2:
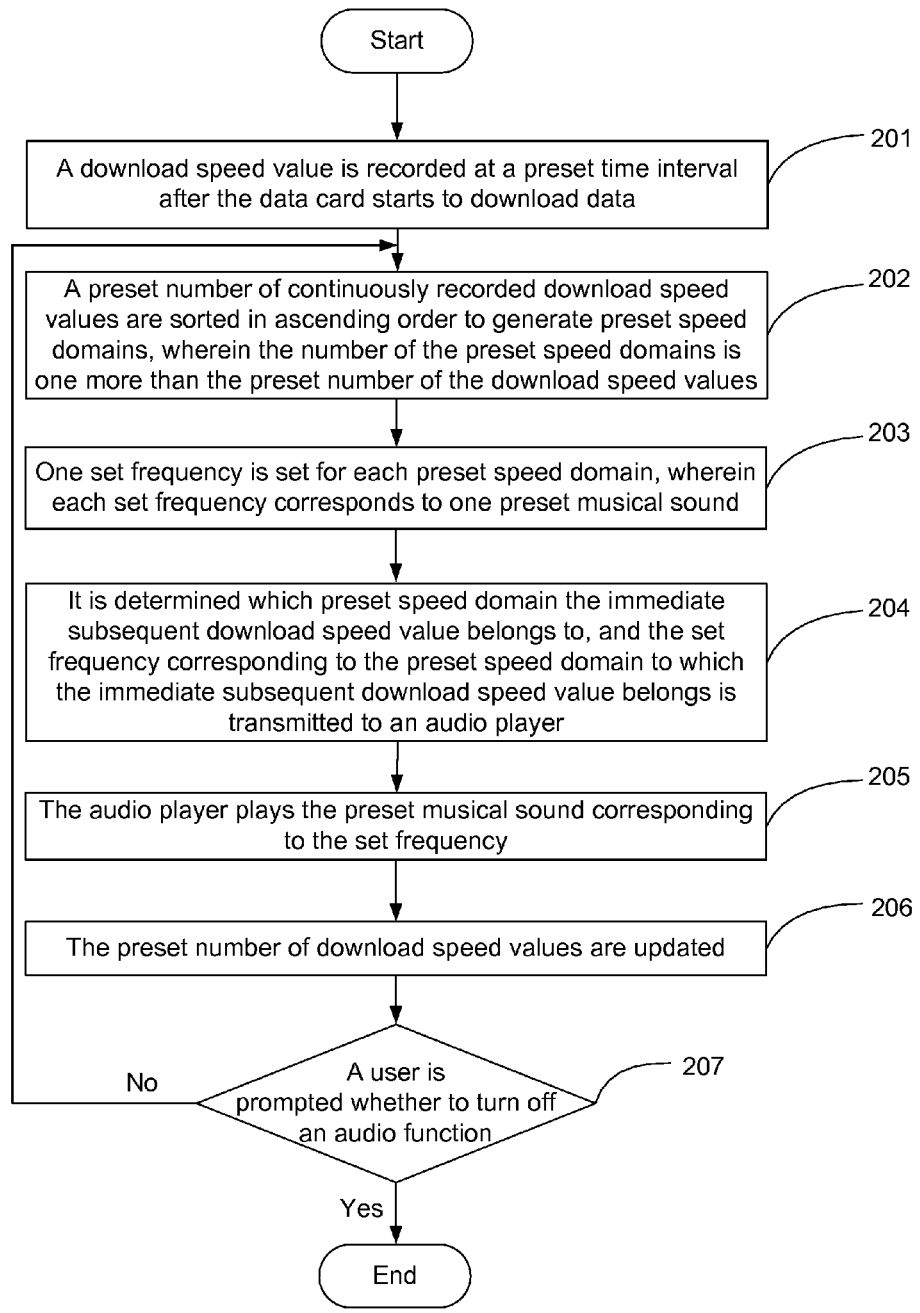
FIG. 2 shows a schematic flowchart of the method for editing and playing music according to the data download speed in Embodiment 2 of the disclosure.

FIG. 2 shows a schematic flowchart of the method for editing and playing music according to a data download speed in Embodiment 2 of the disclosure, and in particular a schematic flowchart of a method for playing preset music through combining a data card and an audio player.

As shown in FIG. 2, the method of the embodiment includes that:

Step 201, a download speed value is recorded at a preset time interval after the data card starts to download data;

in the embodiment, the preset time interval can be one second, or two or more seconds.

Step 202, a preset number of continuously recorded download speed values are sorted in ascending order to generate preset speed domains, wherein the number of the preset speed domains is one more than the preset number of the download speed values;

in the embodiment, the preset number of the continuously recorded download speed values can be six, and the number of the preset speed domains generated corresponding to the six download speed values is seven.

Step 203, one set frequency is set for each preset speed domain, wherein each set frequency corresponds to one preset musical sound;

in the step, the number of the preset musical sounds can be pre-selected, wherein the number of the preset musical sounds is the same as that of the preset speed domains; in the embodiment, the preset musical sound is preset music, and the preset music can be the preset music composed of some simple single syllables or multi-syllables.

Step 204, it is determined which preset speed domain the immediate subsequent download speed value belongs to, and the set frequency corresponding to the preset speed domain to which the immediate subsequent download speed value belongs is transmitted to an audio player.

Step 205, the audio player plays the preset musical sound corresponding to the set frequency.

Step 206, the preset number of download speed values are updated;

after one preset musical sound is completely played, the data card updates a preset number (which is six in the embodiment) of download speed values, so as to acquire a new preset number (which is six in the embodiment) of download speed values to be ready to execute Step 202.

Step 207, a user is prompted whether to turn off an audio function, if not, i.e., the user selects not to turn off the audio function, the step that the preset number of continuously recorded download speed values are sorted in ascending order to generate the preset speed domains, wherein the number of the preset speed domains is one more than the preset number of download speed values is executed, that is, Step 202 is executed; otherwise, the user selects to turn off the audio function, and the application program is exited.

In the embodiment, after six download speed values are updated, the user is prompted whether to turn off the audio function, if the user selects not to turn off the audio function, the step that the preset number (six) of the continuously recorded download speed values are sorted in ascending order to generate the preset speed domains, wherein the number of the preset speed domains (seven) is one more than the preset number of download speed values is executed, that is, Step 202 is executed; otherwise, the application program is exited.

In the embodiment, through the combination of the data card with the audio player, when the data card downloads data, a preset music with a corresponding set frequency is continuously selected according to a download speed and then is played via the audio player, so that an entertainment effect of "playing music randomly" is achieved, thereby increasing entertainment experience of a user and improving competitiveness of a product.

In another embodiment, the number of the continuously recorded download speed values can be preset as 4, 5 or other values; correspondingly, the number of the preset speed domains generated according to the continuously recorded download speed values is one more than the number of the download speed values; furthermore, the purpose of playing music according to a download speed can be achieved through presetting a number of preset musical sounds, wherein the number of preset musical sounds is the same as the number of the preset speed domains.

Embodiment 3

Figure 3:
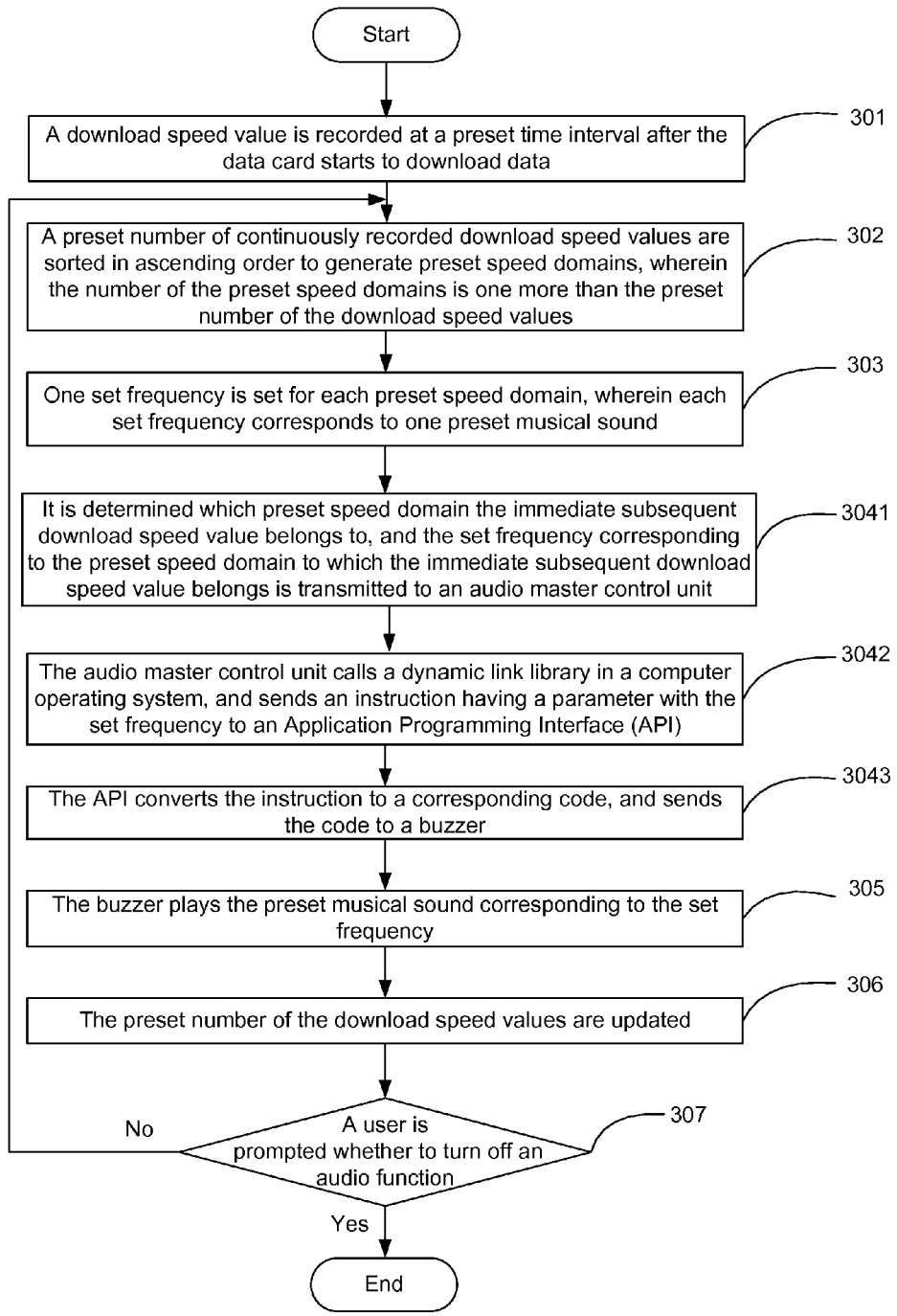
FIG. 3 shows a schematic flowchart of the method for editing and playing music according to the data download speed in Embodiment 3 of the disclosure.

FIG. 3 shows a schematic flowchart of the method for editing and playing music according to a data download speed in Embodiment 3 of the disclosure, and in particular a schematic flowchart of a method for playing a buzzing sound through combining a data card and a buzzer on a computer's mainboard.

As shown in FIG. 3, in the steps of the method in the embodiment:

Step 301, Step 302 and Step 303 are correspondingly the same as Step 201, Step 202 and Step 203 in the embodiment shown in FIG. 2; and in the embodiment, a preset musical sound is a buzzing sound; the frequencies of seven buzzing sounds are respectively the same as that of the seven basic tones in sequence, that is, the frequencies of the seven buzzing sounds are respectively the same as the frequencies of the seven basic tones 1do, 2re, 3mi, 4fa, 5sol, 6la, and 7si in sequence.

Wherein, the Step 304 specifically includes that:

Step 3041, it is determined which preset speed domain the immediate subsequent download speed value belongs to, and the set frequency corresponding to the preset speed domain to which the immediate subsequent download speed value belongs is transmitted to an audio master control unit.

Step 3042, the audio master control unit calls a dynamic link library in a computer operating system, and sends an instruction having a parameter with the set frequency to an Application Programming Interface (API); and the audio master control unit accesses the computer operating system, calls a corresponding function of the system dynamic link library, and issues the instruction having the parameter with the set frequency.

Step 3043, the API converts the instruction to a corresponding code, and sends the code to a buzzer;

the called function accesses the API, the API generates a recognizable code instruction for a computer, and transmits the instruction to a buzzer on a mainboard of the computer.

Step 305, the buzzer plays the preset musical sound corresponding to the set frequency;

the buzzer issues a buzzing sound according to the acquired parameter with the set frequency to complete one buzzing sound playing.

Step 306, the preset number of the download speed values are updated.

Step 307, a user is prompted whether to turn off an audio function, if the user selects to not turn off the audio function, the step that the preset number of continuously recorded download speed values are sorted in ascending order to generate preset speed domains is executed, wherein the number of the preset speed domains is one more than the preset number of download speed values; otherwise, the application program is exited.

In the embodiment, the user is prompted whether to turn off the audio function, if the user selects not to turn off the audio function, the step that the six download speed values are sorted in ascending order to generate seven preset speed domains is executed; the above steps are repeated to achieve an effect of continuously playing music until the user turns off the function.

The process of the method for playing a buzzing sound by combining a data card and a buzzer on mainboard of a computer in the embodiment will be described in detail hereinafter:

the data card starts to download data, and the speed recorder starts to record a data download speed value at a speed of one download speed value being recorded every one second.

When the total number of the download speed values (for example, 24, 65, 110, 70, 42, and 12 Kbyte in sequence) is equal to 6, a speed recorder generates seven preset speed domains: (0, 12], (12, 24], (24, 42], (42, 65], (65, 70], (70, 110], and (110, infinite). The frequencies corresponding to the seven preset speed domains are set as 400, 450, 520, 620, 700, 800, and 900 Hz in sequence, i.e., the frequencies required by 1do, 2re, 3mi, 4fa, 5sol, 6la, and 7si.

A speed value in the immediate subsequent second, for example 96, is acquired, it is determined that 96 is within the (70, 110] domain, and the corresponding frequency is 800 Hz.

The speed recorder sends a response instruction with a parameter (the frequency of 800 Hz) to the audio master control unit.

The audio master control unit calls a Beep function in a dynamic link library kernel32.dll of a Windows system, and transmits the instruction having the parameter with the frequency of 800 Hz and the duration of 1000 milliseconds to the Beep function; the Beep issues an instruction to the buzzer through calling an API of the operating system, and thus the buzzer can make 6la sound.

The speed recorder updates the current six speed values as: 65, 110, 70, 42, 12, and 96 Kbyte;

It is determined whether the audio function of the data card is turned off, if the audio function is not turned off, it starts to be performed again from the step that the speed recorder generates seven preset speed domains again according to the updated current six speed values, so as to continuously play music to achieve a musical effect; if the audio function is turned off, the application program is exited.

In the embodiment, through the combination of the data card with the buzzer on the mainboard of the computer, when the data card downloads data, a buzzing sound with a corresponding set frequency is continuously selected according to a download speed and then is played via the buzzer, so that an entertainment effect of "playing music randomly" is achieved, thereby increasing entertainment experience of a user and improving competitiveness of a product.

In another embodiment, the number of the continuously recorded download speed values can be preset as 4, 5 or other values; correspondingly, the number of the preset speed domains generated according to the continuously recorded download speed values is one more than the number of download speed values; furthermore, the purpose of playing music according to a download speed can be achieved through presetting a number of the preset musical sounds, wherein the number of the preset musical sounds is the same as the number of the preset speed domains.

Embodiment 4

Figure 4:
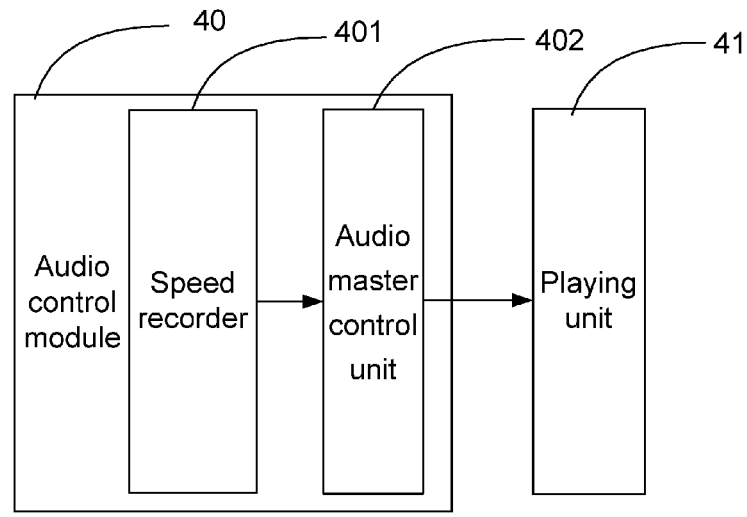
FIG. 4 shows a structure diagram of a device for editing and playing music according to the data download speed in Embodiment 4 of the disclosure.

FIG. 4 shows a structure diagram of a device for editing and playing music according to a data download speed in Embodiment 4 of the disclosure.

As shown in FIG. 4, Embodiment 4 of the disclosure provides the device for editing and playing music according to the data download speed, which includes:

an audio control module 40, configured to generate, according to a preset number of continuously recorded download speed values, a number of preset speed domains, wherein the number of the preset speed domains is one more than the preset number of the download speed values, and set one set frequency for each preset speed domain, wherein each set frequency corresponds to one preset musical sound; and a playing unit 41, connected with the audio control module 40 and configured to, when an immediate subsequent download speed value is within the preset speed domain, play a preset musical sound corresponding to a set frequency which corresponds to a preset speed domain.

Wherein, the audio control module 40 includes a speed reorder 401 and an audio master control unit 402; wherein the speed recorder 401 is configured to record a download speed value at a preset time interval (the preset time interval is one second in the embodiment) after a data card starts to download data; sort a preset number of continuously recorded download speed values in ascending order to generate a number of preset speed domains, wherein the number of the preset speed domains is one more than the preset number of the download speed values; and set one set frequency for each preset speed domain, wherein each set frequency corresponds to one preset musical sound; and the speed recorder 401 is further configured to determine which preset speed domain the immediate subsequent download speed value belongs to, and transmit the set frequency corresponding to the preset speed domain to which the immediate subsequent download speed value belongs to the audio master control unit 402; and the audio master control unit 402 is connected with the speed recorder 401 and the playing unit 41, and is configured to transmit the set frequency corresponding to the preset speed domain to which the immediate subsequent download speed value belongs to the playing unit 41 for playing the preset musical sound corresponding to the set frequency.

In the embodiment, the preset number of the continuously recorded download speed values is six; correspondingly, the number of the generated preset speed domains is seven; the speed recorder 401 records, after the data card starts to download data, one download speed value at the preset time interval (such as one second) to acquire six continuous download speed values, sort the six continuous download speed values in ascending order to generate seven preset speed domains, sets one set frequency for each preset speed domain, wherein each set frequency corresponds to one preset musical sound, when receiving a subsequent download speed value, the speed recorder 401 determines which preset speed domain the immediate subsequent download speed value is within, and transmits the set frequency corresponding to the preset speed domain to which the immediate subsequent download speed value belongs to the audio master control unit 402; and then the audio master control unit 402 transmits the set frequency corresponding to the preset speed domain to which the immediate subsequent download speed value belongs to the playing unit 41, and the playing unit 41 plays the preset musical sound corresponding to the set frequency.

After transmitting the set frequency corresponding to the subsequent download speed value to the playing unit 41, the speed recorder 401 further needs to update the latest six download speed values, i.e., the last six download speed values; then prompt a user whether to turn off an audio function; if the user selects not to turn off the audio function, the step of sorting the updated six download speed values in ascending order to generate seven preset speed domains is executed, and the above steps are repeated to achieve a continuous playing effect; if the user selects to turn off the audio function, exit the application program.

In the embodiment, the playing unit 41 can be either an audio player, or a buzzer configured on a mainboard of a computer; the preset time interval can be one second, or two or more seconds; the preset musical sound can be either a preset music composed of some preset simple single syllables or multi-syllables, or a buzzing sound; and the buzzing sound can be seven basic tones 1do, 2re, 3mi, 4fa, 5sol, 6la, and 7si, that is, the frequencies of the buzzing sound can be respectively the same as that of the seven basic tones 1do, 2re, 3mi, 4fa, 5sol, 6la, and 7si in sequence.

In another embodiment, the number of the continuously recorded download speed values can be preset as 4, 5 or other values; correspondingly, the number of preset speed domains generated according to the continuously recorded download speed values is one more than the number of download speed values; furthermore, the purpose of playing music according to the download speed can be achieved through presetting a number of the preset musical sounds, wherein the number of the preset musical sounds is the same as the number of the preset speed domains.

Embodiment 5

Figure 5:
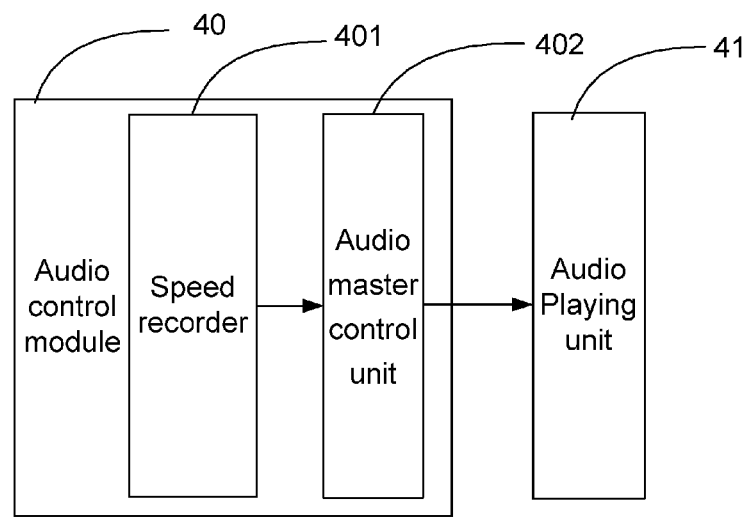
FIG. 5 shows a structure diagram of the device for editing and playing music according to the data download speed in Embodiment 5 of the disclosure.

FIG. 5 shows a structure diagram of the device for editing and playing music according to a data download speed in Embodiment 5 of the disclosure, and in particular one embodiment for playing preset music by combining a data card and an audio player.

By comparing the device in Embodiment 5 with the structure of the device in the embodiment shown in FIG. 4, both of the devices include the audio control module 40, wherein the audio control module 40 includes the speed recorder 401 and the audio master control unit 402 connected with the speed recorder 401. Each same functional module has the same function, so no further description is needed.

The difference between the device in the embodiment and the device in the embodiment shown in FIG. 4 is that: the playing unit 41 in the embodiment is specifically an audio player 41; and the preset musical sound can specifically be a preset music composed of some preset simple single syllables or multi-syllables.

In another embodiment, the number of the continuously recorded download speed values can be preset as 4, 5 or other values; correspondingly, the number of preset speed domains generated according to the continuously recorded download speed values is one more than the number of download speed values; furthermore, the purpose of playing music according to the download speed can be achieved through presetting a number of the preset musical sounds, wherein the number of the preset musical sounds is the same as the number of the preset speed domains.

Embodiment 6

Figure 6:
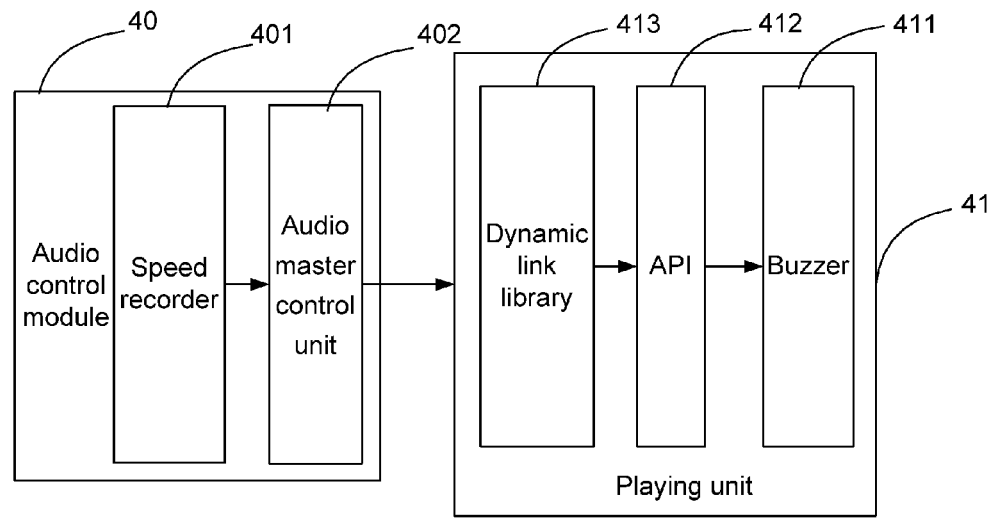
FIG. 6 shows a structure diagram of the device for editing and playing music according to the data download speed in Embodiment 6 of the disclosure.

FIG. 6 shows a structure diagram of the device for editing and playing music according to a data download speed in Embodiment 6 of the disclosure, and in particular one embodiment for playing a preset buzzing sound by combining a data card and a buzzer on a mainboard of a computer.

As shown in FIG. 6, the device in the embodiment includes the audio control module 40 and the playing unit 41, wherein the audio control module 40 includes the speed recorder 401 and the audio master control unit 402.

The functions of the speed recorder 401 and the audio master control unit 402 in the embodiment are the same as that in the embodiment shown in FIG. 5, so no further description is needed.

The difference between the embodiment and the embodiment shown in FIG. 5 is that: the playing unit 41 is different; in the embodiment, the playing unit 41 includes a buzzer 411 configured on a mainboard of a computer; the device in the embodiment is connected with the buzzer 411 on the mainboard of the computer via an audio master control unit 402; and a signal transmission between the audio master control unit 402 and the buzzer 411 includes that:

the audio master control unit 402 is connected with the mainboard of the computer; the audio master control unit 402 accesses the operating system of the computer, calls a corresponding function of a system dynamic link library 413, and issues an instruction with a parameter (the parameter can be a frequency) to an API 412; the API 412 generates the instruction into a code instruction recognizable for the computer, and transmits the code instruction to the buzzer 411 on the mainboard of the computer; and the buzzer 411 plays the buzzing sound with the corresponding frequency.

The number of the buzzing sound in the embodiment can be seven; the frequencies of the seven buzzing sounds can be respectively the same as that of seven basic tones in sequence, that is, the frequencies of the seven buzzing sounds are respectively the same as that of the seven basic tones 1do, 2re, 3mi, 4fa, 5sol, 6la, and 7si in sequence.

Embodiment 7

Figure 7:
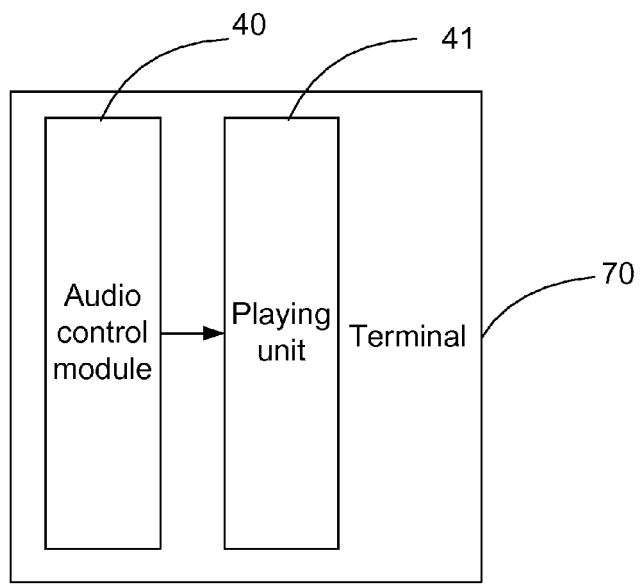
FIG. 7 shows a structure diagram of a terminal for editing and playing music according to the data download speed in Embodiment 7 of the disclosure.

FIG. 7 shows a structure diagram of a terminal for editing and playing music according to a data download speed in Embodiment 7 of the disclosure.

As shown in FIG. 7, the disclosure provides a terminal 70 for editing and playing music according to the data download speed, which includes a device for editing and playing music according to a data download speed, wherein the device is configured to generate, according to a preset number of continuously recorded download speed values, a number of preset speed domains, wherein the number of the preset speed domains is one more than the preset number of the download speed values, and set one set frequency for each preset speed domain, wherein each set frequency corresponds to one preset musical sound; and when the immediate subsequent download speed value is within the preset speed domain, play the preset musical sound corresponding to the set frequency which corresponds to the preset speed domain.

In the embodiment, the device for editing and playing music according to a data download speed is further configured to update a preset number of download speed values, and output prompt information of whether to turn off an audio function.

The device for editing and playing music according to a data download speed in the embodiment includes: the audio control module 40 and the playing unit 41 connected with the audio control module 40, wherein the playing unit 41 can be a music player or a buzzer.

The audio control module 40 in the embodiment includes the speed recorder 401 and the audio master control unit 402. The internal structure of the device in the embodiment and the internal structure of the device in the embodiment shown in FIG. 6 are the same, so no further description is needed.

In the disclosure, through the combination of the data card with the computer buzzer or audio player, when the data card downloads data, a buzzing sound or preset musical sound with a corresponding frequency is continuously selected according to the download speed and then is played via the buzzer of the mainboard of the computer or the audio player, so that an entertainment effect of "playing music randomly" is achieved, thereby increasing entertainment experience of a user and improving competitiveness of a product.

In another embodiment, the number of the continuously recorded download speed values can be preset as 4, 5 or other values; correspondingly, the number of preset speed domains generated according to the continuously recorded download speed values is one more than the number of download speed values; furthermore, the purpose of playing music according to the download speed can be achieved through presetting a number of the preset musical sounds, wherein the number of the preset musical sounds is the same as the number of the preset speed domains.

The above are only the preferred embodiments of the disclosure and are not intended to limit the scope of protection of the disclosure, either and any equivalent structure or flow transformation made, or a direct or indirect application in other relevant technical fields shall fall within the scope of protection of the disclosure according to the content of the description and the drawings of the disclosure.

The invention claimed is:

1. A method for editing and playing music according to a data download speed, comprising:

Step A, recording a download speed value at a preset time interval after data download is started; sorting a preset number of the continuously recorded download speed values in ascending order;

generating, according to the preset number of continuously recorded download speed values, a number of speed domains, wherein the number of the speed domains is one more than the preset number of the download speed values, and setting one set frequency for each speed domain, wherein each set frequency corresponds to one preset musical sound;

determining which speed domain the immediate subsequent download speed value belongs to, and transmitting the set frequency, corresponding to the speed domain which the immediate subsequent download speed value belongs to, to an audio master control unit:

calling a dynamic link library in a computer operating system, and sending an instruction having a parameter with the set frequency to an Application Programming Interface (API);

converting the instruction to a recognizable code instruction for a computer, and sending the code to a playing unit;

Step B, playing a preset musical sound corresponding to a set frequency which corresponds to a speed domain when an immediate subsequent download speed value is within the speed domain, and Step C, updating the preset number of the continuously recorded download speed values and prompting a user whether to turn off an audio function;

if the user selects not to turn off the audio function, returning to Step A; and if the user selects to turn off the audio function, exiting an application program.

2. The method for editing and playing the music according to the data download speed according to claim 1, wherein the number of the speed domains is seven, and the preset number of the download speed values is six.

3. The method for editing and playing the music according to the data download speed according to claim 2, wherein the step of playing the preset musical sound corresponding to the set frequency which corresponds to the speed domain when the immediate subsequent download speed value is within the speed domain comprises:

determining which speed domain the immediate subsequent download speed value belongs to, and transmitting the set frequency corresponding to the speed domain to which the immediate subsequent download speed value belongs to a playing unit; and playing the preset musical sound corresponding to the set frequency by the playing unit.

4. The method for editing and playing the music according to the data download speed according to claim 3, wherein the preset musical sound is preset music or buzzing sound, wherein the buzzing sound comprise seven buzzing sounds whose frequencies are respectively the same as frequencies of seven basic tones in sequence.

5. The method for editing and playing the music according to the data download speed according to claim 1, wherein the step of playing the preset musical sound corresponding to the set frequency which corresponds to the speed domain when the immediate subsequent download speed value is within the speed domain comprises:

determining which speed domain the immediate subsequent download speed value belongs to, and transmitting the set frequency corresponding to the speed domain to which the immediate subsequent download speed value belongs to a playing unit; and playing the preset musical sound corresponding to the set frequency by the playing unit.

6. The method for editing and playing the music according to the data download speed according to claim 5, wherein the preset musical sound is preset music or buzzing sound, wherein the buzzing sound comprise seven buzzing sounds whose frequencies are respectively the same as frequencies of seven basic tones in sequence.

7. A device for editing and playing music according to a data download speed, comprising an audio control module and a playing unit, wherein the audio control module is configured to perform step A comprising generating, according to a preset number of continuously recorded download speed values, a number of speed domains, wherein the number of the speed domains is one more than the preset number of the download speed values, and set one set frequency for each speed domain, wherein each set frequency corresponds to one preset musical sound;

determining which speed domain the immediate subsequent download speed value belongs to, and transmitting the set frequency, corresponding to the speed domain which the immediate subsequent download speed value belongs to, to an audio master control unit:

calling a dynamic link library in a computer operating system, and sending an instruction having a parameter with the set frequency to an Application Programming Interface (API); and converting the instruction to a recognizable code instruction for a computer, and sending the code to the playing unit;

the playing unit is connected with the audio control module and is configured to perform step B comprising playing a preset musical sound corresponding to a set frequency which corresponds to a speed domain when an immediate subsequent download speed value is within the speed domain, the audio control module is further configured to perform step C comprising updating the preset number of the continuously recorded download speed values and prompting a user whether to turn off an audio function;

if the user selects not to turn off the audio function, returning to Step A; and if the user selects to turn off the audio function, exiting an application program;

wherein the audio control module comprises:

a speed recorder, configured to record a download speed value at a preset time interval after the device starts to download data; sort the preset number of the continuously recorded download speed values in ascending order to generate the speed domains, wherein the number of the speed domains is one more than the preset number of the download speed values; set one set frequency for each speed domain, wherein each set frequency corresponds to one preset musical sound;

wherein the speed recorder is further configured to output prompt information of whether to turn off an audio function.

8. The device for editing and playing the music according to the data download speed according to claim 7, wherein the number of the speed domains is seven, and the preset number of the download speed values is six.

9. The device for editing and playing the music according to the data download speed according to claim 8, wherein the audio control module further comprises an audio master control unit;

the speed recorder is further configured to determine which speed domain the immediate subsequent download speed value belongs to, and transmit the set frequency corresponding to the speed domain to which the immediate subsequent download speed value belongs to the audio master control unit; and the audio master control unit is connected with the speed recorder and the playing unit, and is configured to transmit the set frequency corresponding to the speed domain to which the immediate subsequent download speed value belongs to the playing unit for playing the preset musical sound corresponding to the set frequency.

10. The device for editing and playing the music according to the data download speed according to claim 7, wherein the audio control module further comprises an audio master control unit;

the speed recorder is further configured to determine which preset speed domain the immediate subsequent download speed value belongs to, and transmit the set frequency corresponding to the preset speed domain to which the immediate subsequent download speed value belongs to the audio master control unit; and the audio master control unit is connected with the speed recorder and the playing unit, and is configured to transmit the set frequency corresponding to the preset speed domain to which the immediate subsequent download speed value belongs to the playing unit for playing the preset musical sound corresponding to the set frequency.

11. The device for editing and playing the music according to the data download speed according to claim 7, wherein the playing unit comprises a buzzer.

12. The device for editing and playing the music according to the data download speed according to claim 7, wherein the playing unit is an audio player.

13. A terminal for editing and playing music according to a data download speed, comprising a device for editing and playing the music according to the data download speed, wherein the device is configured to perform the following steps, Step A, recording a download speed value at a preset time interval after data download is started; sorting a preset number of the continuously recorded download speed values in ascending order;

generating, according to the preset number of continuously recorded download speed values, a number of speed domains, wherein the number of the speed domains is one more than the preset number of the download speed values, and set one set frequency for each speed domain, wherein each set frequency corresponds to one preset musical sound;

determining which speed domain the immediate subsequent download speed value belongs to, and transmitting the set frequency, corresponding to the speed domain which the immediate subsequent download speed value belongs to, to an audio master control unit:

calling a dynamic link library in a computer operating system, and sending an instruction having a parameter with the set frequency to an Application Programming Interface (API); and converting the instruction to a recognizable code instruction for a computer, and sending the code to the playing unit;

Step B, playing a preset musical sound corresponding to a set frequency which corresponds to a speed domain when an immediate subsequent download speed value is within the speed domain; and Step C, updating the preset number of the continuously recorded download speed values and prompting a user whether to turn off an audio function;

if the user selects not to turn off the audio function, returning to Step A; and if the user selects to turn off the audio function, exiting an application program.

* * * * *